(12) United States Patent
Burger

(10) Patent No.: US 6,216,828 B1
(45) Date of Patent: Apr. 17, 2001

(54) ROTOR WITH HAT SECTION AIR PUMP

(75) Inventor: Charles E. Burger, Farmington, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/057,219

(22) Filed: Apr. 8, 1998

Related U.S. Application Data
(60) Provisional application No. 60/069,086, filed on Dec. 10, 1997.

(51) Int. Cl.[7] .................................................... F16D 65/10
(52) U.S. Cl. ............................... 188/218 XL; 188/218 R; 188/18 A
(58) Field of Search .................... 188/218 R, 218 XL, 188/18 A, 264 A, 264 AA, 71.6

(56) References Cited

U.S. PATENT DOCUMENTS

| | | | | |
|---|---|---|---|---|
| 5,161,652 | * | 11/1992 | Suzuki | 188/218 XL |
| 5,915,747 | * | 6/1999 | Dickerson et al. | 188/218 XL |

FOREIGN PATENT DOCUMENTS

| | | | | |
|---|---|---|---|---|
| 3924849 | * | 2/1991 | (DE) | 188/218 XL |
| 000521754 | | 1/1993 | (EP) . | |
| 61-282633 | * | 12/1986 | (JP) | 188/264 AA |
| 2-17235 | * | 1/1990 | (JP) | 188/218 XL |
| 4233424 | * | 4/1994 | (JP) | 188/218 XL |

* cited by examiner

Primary Examiner—Robert J. Oberleitner
Assistant Examiner—Mariano Sy
(74) Attorney, Agent, or Firm—Marshall & Melhorn, LLc

(57) ABSTRACT

The invention is directed to a rotor having a vented hat section. A plurality of spaced apart vents are defined in the rotor hat wall. The vents are defined by a first aperture in the radially outer hat wall surface, a second aperture in the radially inner hat wall surface and a vent wall extending therebetween. The vent wall includes an upper surface and a lower surface which extend from the from the first aperture to the second aperture. The upper surface and lower surfaces form an angle A with respect to the outer surface of the hat wall which partially determines the quantity of air moved through the vents when the rotor turns. The vent wall also preferably includes a pair of approximately parallel side surfaces between the upper and lower surfaces which extend through the hat wall. The angle B of the vent wall side surfaces with respect to the radius of the rotor partially determines the quantity of air pushed or pumped through the vents when the rotor turns. Each vent aperture is elongated and extends along a first aperture axis. The aperture axis forms a predetermined angle C with respect to a line extending axially along the radially outer surface of said hat wall. The size of the angle C determines in part the quantity of air flowing through the vent when the rotor is turning.

2 Claims, 1 Drawing Sheet

ROTOR WITH HAT SECTION AIR PUMP

RELATED APPLICATION

This application claims the benefit of U.S. Provisional Application No. 60/069,686, filed Dec. 10, 1997. The provisional application, Ser. No. 60/069,086, is hereby incorporated by reference in its entirety.

BACKGROUND OF INVENTION

The present invention relates to a vehicle brake rotor and specifically to a rotor having a vented hat section in which the angles of the vents are adjusted to increase the quantity of air flowing through the vents.

Rotors are generally well known in the art, and are used extensively in caliper disc brakes, power transmission devices, clutches, and other similar machinery and mechanisms. Brake rotors are used in vehicle disc brake system which slow the vehicle by inhibiting the rotation of the vehicle wheels. Rotors typically include a central hat section secured to the spindle or axle of the vehicle wheel and a peripheral friction surface extending radially from the hat section. When the driver applies the brakes, brake pads are moved into engagement with the friction surface creating frictional forces which slow the vehicle. A vast amount of heat is generated at the friction surface by the frictional forces during braking. The heat is conducted from the friction surface to the rest of the rotor and to other components to which the rotor is connected. Excess heat leads to premature brake wear and/or failure.

Rotors are commonly cooled using moving air to absorb the heat from the rotor and carry it away. It is known to "ventilate" the rotors by forming holes or vents through portions of the rotor. As the rotor turns, air is moved through the vents to cool the rotor. The cooling effectiveness of the vents is proportional to the quantity of air passing through the vents. The more air which moves through the vents, the more heat that is dissipated and the greater the cooling effects. Therefore, it is desirable to move as much air as possible through the vents.

Vents have been formed in the hat section to move cooling air through the hat section for cooling the rotor when the rotor turns. Typically these vents have been formed through the hat wall at right angles to the hat wall surface. As the rotor turns, the right angled vents create a pressure differential from one side of the hat wall to the other which causes the air to move from the areas of high pressure to the areas of low pressure. It is desirable to increase the amount of air moved through the hat wall vents to improve the cooling effectiveness of the vents.

SUMMARY OF THE INVENTION

The invention is directed to a rotor having a vented hat section. The rotor includes a central hat section joined to a radially outer annular friction section. The hat section includes a generally circular mounting face for mounting the rotor on an associated drive member such as a spindle or vehicle axle, and a cylindrical hat wall extending axially from the periphery of the mounting face to the radially inner edge of the annular friction section. The hat wall includes a radially inner surface and a radially outer surface.

A plurality of spaced apart vents are defined in the hat wall. The vents are preferably defined by a first aperture formed in the hat wall radially outer surface, a second aperture formed in the hat wall radially inner surface, and a vent wall extending through said hat wall from said first aperture to said second aperture. The vent wall preferably includes an upper surface nearest the mounting face and a lower surface nearest the friction section. The vent upper wall and lower surfaces preferably extend straight through the hat wall and are parallel to each other.

The upper and lower surfaces form an angle A with respect to the outer surface of the hat wall. The size of the angle A determines in part the quantity of air pushed or pumped through the vent when the rotor turns. The angle A can be varied to change the amount of air moved through the vents when the rotor turns. The angle A is preferably not ninety degrees, although any suitable size of angle A may be used.

The vents also preferably include a pair of side surfaces between the upper and lower surfaces which also extend through the hat wall and are approximately parallel to each other. The angle B formed between the vent walls and the radius of the rotor determines in part the quantity of air pushed or pumped through the vents when the rotor turns. The angle B can be varied to achieve a predetermined amount of air moving through the hat section vents as the rotor turns.

The vent aperture formed in the outer hat wall surface is elongated and extends along a first aperture axis. The aperture axis forms a predetermined angle C with respect to a line extending axially along the radially outer surface of said hat wall. The size of the angle C determines in part the quantity of air flowing through the vent when the rotor is turning. The orientation of the aperture can be changed to change the direction of the aperture axis and thus change its angle C with respect to the axially extending line to achieve a predetermined quantity of air flow through the vent.

BRIEF DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENTS

Figure 1:
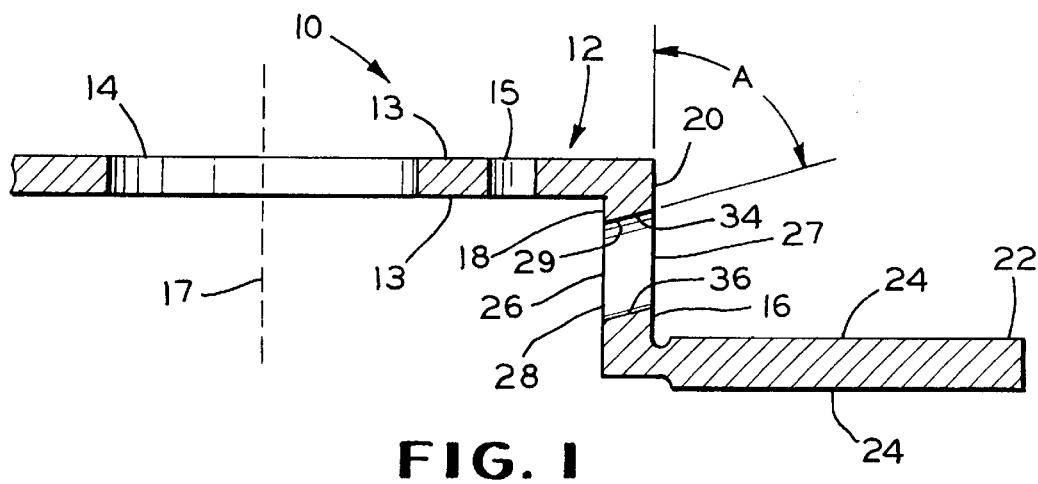
FIG. 1 is a sectional view of a portion of a vented rotor showing the hat wall vent and the angle between the upper of the hat wall vent and the outer surface of the hat wall which can be varied in accordance with the invention.
Figure 2:
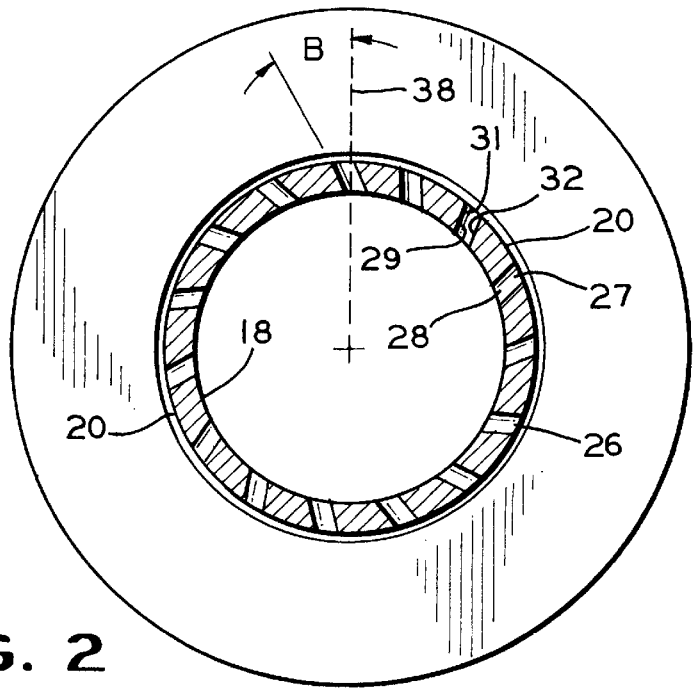
FIG. 2 is an elevational sectional view of a rotor showing the hat wall vent and the angle between the wall of the hat wall vent and the radius of the rotor which can be varied in accordance with the invention.
Figure 3:
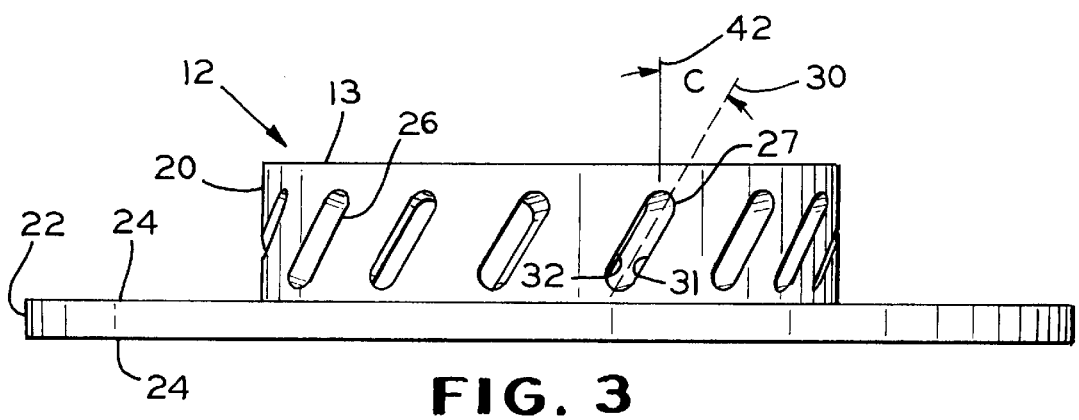
FIG. 3 is a perspective view of the rotor showing the hat wall vent and the angle of the hat wall vent walls with respect to a line extending axially along the hat wall which can be varied in accordance with the invention.

For purposes of description herein, the terms "upper," "lower," "right," "left," "rear," "front," "vertical," "horizontal," and derivatives thereof shall relate to the invention oriented in FIGS. 1, 2 and 3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to the drawings, there is illustrated in FIGS. 1, 2 and 3 a vented rotor formed in accordance with the invention, denoted generally by the reference numeral 10. The rotor 10 is of the type adapted for use in conjunction with a variety of vehicle braking systems, such as caliper disc brakes and the like. The rotor 10 includes a central hub or hat section 12 having a mounting face 13 for mounting the rotor 10 on an associated drive member (not shown), such as a spindle or vehicle axle. The mounting face 13 is preferably generally circular, although other suitable shape may be used. A central pilot aperture 14 is formed in the center of the mounting face 13 for receiving a spindle hub or the like (not shown). A plurality of circumferentially spaced apart fastener apertures 15 are also formed in the mounting face 13 for receiving fasteners (not shown) for securing the rotor 10 on an associated drive mechanism in the conventional manner.

The hat section 12 also includes a hat wall 16 extending axially from the periphery of the mounting face 13. The hat wall 16 extends completely around the periphery of the mounting face 13 and includes an axis 17 extending through the center of the mounting face. The hat wall 16 is preferably cylindrical, however the hat wall may be inclined relative to the axis 17 to form a conical shape or a portion thereof. Alternatively, the hat wall 16 may form any other suitable shape. The hat wall 16 further includes a radially inner surface 18 and a radially outer surface 20. The hat wall surfaces 18, 20 are preferably straight and mutually parallel, however, alternatively they may be inclined with respect to each other.

The rotor 10 also includes an annular friction section 22 extending radially outwardly from the hat wall 16. Flat annular friction surfaces 24 are located on opposite sides of the friction section 22. The friction surfaces 24 are adapted to interface with associated friction members (not shown), such as brake pads or the like. Optional vents (not shown) may be formed in the friction surfaces 24 for moving air therethrough for cooling the friction surfaces. The friction surfaces 24 preferably form 90 degree angles with respect to the axis 17.

A plurality of spaced apart vents 26 are disposed in the hat wall 16, to provide cooling air flow about the hat section 12 when the rotor turns. The vents 26 are preferably similar in shape and orientation, and to avoid duplication, only a single vent shall be described. Each of the vents 26 are preferably defined by a first aperture 27 formed in the hat wall radially outer surface 20, a second aperture 28 formed in the hat wall radially inner surface 18, and a vent wall 29 extending through said hat wall 16 from said first aperture 27 to said second aperture 28. The vents 26 may be formed by machining, or they may be cast into the hat wall.

The first aperture 27 is preferably elongated, extending along a first aperture axis 30, and the second aperture 28 is elongated, extending along a second aperture axis (not shown). The first and second aperture axes are preferably parallel, and the orientation of the vent shall be described in reference to the first aperture 27. The vent wall 29 preferably includes a first side surface 31 and a second side surface 32 each extending along the first aperture axis 30. The vent wall 29 preferably also includes an upper surface 34 nearest the mounting face 13 and a lower surface 36 nearest the friction section 22. The vent wall upper and lower surfaces 34 and 36 preferably extend straight through the hat wall 16 and are parallel to each other.

The upper and lower surfaces 34, 36 form an angle A with respect to the outer surface of the hat wall 20. The size of the angle A determines in part the quantity of air pushed or pumped the vent 26 when the rotor 10 turns. The angle A can be adjusted by changing the orientation of the vent wall upper and lower surfaces 34, 36 as they extend through the hat wall 16, to provide a predetermined amount of air flowing through the vents 26 of the turning rotor. The angle A is preferably not ninety degrees, although any suitable size of angle A may be used. Alternatively, the upper and lower surfaces 34, 36 may not be parallel such that these surfaces form different angles (not shown) with respect to the outer surface of the hat wall 20 and each angle can be varied independently to change the amount of air flowing through the vents when the rotor turns.

The vent side walls 31, and 32 preferably extend straight through the hat wall 16 and are parallel to each other. As shown in the plan view of FIG. 2 the first and second apertures are circumferentially off set and, the vent side walls 31, 32 extend through the hat wall 16 to form an angle B with respect to the radius 38 of the hat section 12. The size of the vent wall angle B determines in part the quantity of air pushed or pumped through the vents 26 when the rotor turns. The angle B can be adjusted by changing the orientation of the vent side walls 31, 32 as they extend through the hat wall 16, to provide a predetermined amount of air flowing through the vents 26 of the turning rotor. Alternatively, the vent side walls 31, 32 may not be parallel, and the surfaces of the walls may form different angles (not shown) with respect to the the radius 38 of the hat section 12 each of which can be varied independently to change the quantity of air flowing through the vents when the rotor turns.

The vent apertures 27, 28 are elongated and extend along the aperture axes as described above. The first aperture axis 30 forms an angle C with respect to a line 42 extending axially along the outer hat wall surface 20. The axially extending line 42 forms an approximate right angle to the friction surface 24. The size of the angle C determines in part the quantity of air pushed or pumped through the vents 26 when the rotor is turning. The orientation of the vent apertures 27, 28 can be adjusted to change the direction of the aperture axes which varies the angle C to provide a predetermined amount of air flowing through the vents 26 of the turning rotor. The angle C is preferably not zero degrees such that the axes extend axially along the hat wall 16. However, any suitable size of angle C may be used. Alternatively, the first and second aperture axes are not parallel and each axis forms a different angle (not shown) with respect to the line 42 which may be changed independently to alter the quantity of air flowing through the vents.

The angles A, B, and C can all be varied independently from each other to achieve the desired airflow through the vent when the rotor is turning. Also, although the vents preferably have similar shapes, orientations and angles A, B, and C, the vents may have different shapes and orientations. The angles A, B, and C may all vary for each vent or for groups of vents and each angle may be changed independently to adjust the quantity of air flowing through the vents.

In accordance with the provisions of the patent statutes, the present invention has been described in what is considered to represent its preferred embodiment, however it should be noted that the invention can be practiced otherwise than as specifically illustrated and described without departing from its spirit or scope.

What is claimed is:

1. A brake rotor comprising:

a central hat section including a mounting face and a hat wall extending therefrom, said hat wall having an axis extending through the center of said mounting face and a radially inner surface and a radially outer surface;

an annular friction surface extending radially from said hat section; and at least one vent formed in said hat wall and defined by a first aperture formed in said radially outer surface of said hat wall, a second aperture formed in said radially inner surface of said hat wall and a vent wall extending through said hat wall between said first and second apertures, said first aperture being elongated and extending along a first aperture axis, wherein said aperture axis forms a predetermined angle less than 90 degrees with respect to a line extending perpendicular to said friction surface along the radially outer surface of said hat wall and the size of said angle determines in part the quantity of air flowing through said vent when said rotor is turning.

2. The invention defined in claim 1 wherein said vent wall includes a first side surface and a second side surface, wherein each of said vent wall side surfaces are generally parallel as they extend through said vent wall.

* * * * *